(12) United States Patent
Bock

(10) Patent No.: US 8,724,695 B2
(45) Date of Patent: May 13, 2014

(54) DETERMINATION OF A TYPE OF PICTURE ENCODING OF A DECOMPRESSED VIDEO SIGNAL

(75) Inventor: Alois Martin Bock, Eastleigh Hampshire (GB)

(73) Assignee: Ericsson AB, Stockholm (SE)

( * ) Notice: Subject to any disclaimer, the term of this patent is extended or adjusted under 35 U.S.C. 154(b) by 862 days.

(21) Appl. No.: 12/529,040

(22) PCT Filed: Feb. 27, 2008

(86) PCT No.: PCT/EP2008/052374
§ 371 (c)(1),
(2), (4) Date: Nov. 2, 2010

(87) PCT Pub. No.: WO2008/104566
PCT Pub. Date: Sep. 4, 2008

(65) Prior Publication Data
US 2011/0044385 A1    Feb. 24, 2011

(30) Foreign Application Priority Data

Feb. 28, 2007   (GB) .................................. 0703888.8

(51) Int. Cl.
*H04N 11/04*   (2006.01)
*H04N 7/50*    (2006.01)
*H04N 7/26*    (2006.01)
*H04N 5/93*    (2006.01)
*H04N 5/932*   (2006.01)
*H04N 5/935*   (2006.01)

(52) U.S. Cl.
CPC ............. *H04N 7/50* (2013.01); *H04N 7/26941* (2013.01); *H04N 7/26377* (2013.01); *H04N 5/93* (2013.01); *H04N 5/932* (2013.01); *H04N 5/935* (2013.01)

USPC ............ 375/240.01; 375/240.24; 375/240.29; 375/240.26; 382/232; 382/235

(58) Field of Classification Search
CPC . H04N 7/50; H04N 7/26941; H04N 7/26377; H04N 5/93; H04N 5/932; H04N 5/935
USPC ............. 375/240.01, 240.24, 240.29, 240.26; 382/232, 235
See application file for complete search history.

(56) References Cited

U.S. PATENT DOCUMENTS

| 7,062,102 B2 * | 6/2006 | Yamada et al. ................ 382/248 |
| 2001/0010706 A1 | 8/2001 | Sato et al. |

FOREIGN PATENT DOCUMENTS

| EP | 1 193 711 | 3/2002 |
| GB | 2 347 039 | 8/2000 |
| GB | 2347039 A * | 8/2000 ............... H04N 5/93 |

OTHER PUBLICATIONS

Wells, N., "Transparent Concatenation of MPEG Compression", EBU Review—Technical, No. 275, (Mar. 21, 1998), pp. 16-23.
Bock, A., "Application Note: Auto Concatenation in TANDBERG Encoders", [Online], TANDBERG Television, (Jan. 1, 2002).
International Search Report for PCT/EP2008/052374, mailed Sep. 1, 2008.

* cited by examiner

*Primary Examiner* — Shawn An
(74) *Attorney, Agent, or Firm* — Nixon & Vanderhye, P.C.

(57) ABSTRACT

A method and apparatus for determining a type of picture encoding of a decompressed video signal by detecting periodic changes of high frequency content of individual fields of the video signal. The determination may be used in particular to align picture types in successive video compression systems in a video compression concatenation chain.

3 Claims, 3 Drawing Sheets

DETERMINATION OF A TYPE OF PICTURE ENCODING OF A DECOMPRESSED VIDEO SIGNAL

This application is the U.S. national phase of International Application No. PCT/EP2008/052374 filed 27 Feb. 2008, which designated the U.S., and claims priority to United Kingdom Application No. GB 0703888.8, filed 28 Feb. 2007, the entire contents of which are hereby incorporated by reference.

TECHNICAL FIELD

This invention relates to determination of a type of picture encoding of a decompressed video signal and in particular to picture type alignment between successive video compression systems.

BACKGROUND ART

With the introduction of new compression algorithms into broadcast systems, video signals which would previously have been compressed and decompressed using MPEG-2 encoding now often undergo several compression/decompression stages using MPEG-2 encoding as well as more advanced algorithms such as H.264 encoding. Whereas in the past, successive MPEG-2 to MPEG-2 encoding/decoding was the predominant mode of concatenation, today's systems often require MPEG-2 to H.264 as well as H.264 back to MPEG-2 concatenation. Once H.264 compression is used for distribution, as well as final transmission to the home, H.264 to H.264 concatenation will be the predominant mode of concatenated compression.

MPEG-2 as well as H.264 algorithms use three types of picture coding: intra coded pictures (I pictures) which are coded without taking predictions from other pictures; forward predicted pictures (P pictures) which are predicted from previously coded I or P pictures and bi-directionally predicted pictures (B pictures) which take predictions from past and future I or P pictures. In H.264, B pictures can also take predictions from other B pictures.

Since the amount of compression varies from one picture type to another, that is B pictures are usually more heavily compressed than P pictures which, in turn are more heavily compressed than I pictures, picture type alignment between successive compression/decompression stages is the most important factor influencing the performance of concatenated compression systems (A. M. Bock, 'Near Loss-Less MPEG Concatenation without Helper Signals', IBC, Amsterdam, September 2001). In particular, if B pictures are used in the downstream encoder these should be aligned with pictures which have previously also been coded as B pictures. This requires that the two encoders not only use a same number of B pictures between I and P pictures but also that the downstream encoder is locked to a coding pattern of the upstream encoder.

Picture type alignment between MPEG-2 compression/decompression systems can be achieved using a method such as that disclosed in GB 2347039, which discloses a method of finding an I picture of a previously MPEG-2 compressed video signal, preferably using a DCT (Discrete Cosine Transform) filter for the detection. Thus, in particular, GB 2347039 discloses using energy levels to determine a picture type and using DCT parameters to determine quantisation level. Since H.264 compression uses two sizes of pixel blocks to form the transform (4×4 and 8×8), both different from the DCT used in MPEG-2, the algorithm described in GB 2347039 is not suitable for the detection of H.264 intra coded pictures. A more general approach to the detection of previously coded picture types is required.

DISCLOSURE OF INVENTION

According to the invention, there is provided a method of determining a type of picture encoding of a decompressed video signal by detecting periodic changes of high frequency content of individual fields of the video signal.

Preferably, the method is arranged to distinguish bi-directionally predicted pictures, B-pictures, from intra coded pictures, I-pictures, and forward predicted pictures, P-pictures.

Conveniently, only top fields of video frames are analysed to determine a type of picture encoding.

Conveniently, the method comprises the steps of: filtering the decompressed video signal with high pass filter means to provide a filtered video signal; obtaining a modulus of the filtered video signal; accumulating moduli for successive fields of the decompressed video signal in a plurality of respective accumulator means; and analysing contents of the respective accumulator means to detect the periodic changes of high frequency content of fields of the video signal.

Advantageously, the method comprises detecting ends of fields of the decompressed signal and switching outputs of a modulus module to the respective accumulator means when an end of field is detected.

Conveniently, analysing contents of the respective accumulator means comprises the steps of: calculating a median of values held in the accumulator means; incrementing a current confidence register if the current accumulator exceeds the median by a predetermined factor and the current confidence register is less than a predetermined threshold; decrementing any of the remaining confidence registers which are greater than zero; and setting an encoder for coding the corresponding field as an intra coded picture, I-picture or forward predicted picture, P-picture for any field for which the confidence register is equal to or exceeds the threshold value.

Advantageously, the method further comprises aligning picture types between successive video compression systems.

According to a second aspect of the invention there is provided a picture type detector for a decompressed video signal comprising: a video signal input connected to high-pass filter means for inputting the decompressed video signal; modulus determining means connected to an output of the high-pass filter and arranged to determine a modulus of the output of the high-pass filter; field synchronisation detection means connected to the video signal input and arranged to output an end of field signal; switching means connected to receive an output of the modulus determining means and controlled by the end of field signal; a plurality of respective accumulator means connected to respective outputs of the switching means corresponding to respective fields; and statistical analysis means connected to outputs of the respective accumulator means arranged to detect a periodic change in values held by the accumulators corresponding to a periodic change of high frequency content of fields of the video signal.

A picture type detector as claimed in claim 8, wherein the statistical analysis means comprises: calculating means arranged to calculate a median of values held in the respective accumulator means; respective confidence registers associated with each of the respective accumulator means; incrementing means arranged to increment a confidence register associated with an accumulator means containing a value which exceeds the median by a predetermined factor when the confidence register is less than a predetermined threshold; decrementing means arranged to decrement any remaining confidence registers which are greater than zero; and setting means arranged to set an encoder for coding the corresponding field as an intra coded picture or forward predicted picture for any field for which the confidence register is equal to or exceeds the threshold value.

According to a third aspect of the invention there is provided a video compression concatenation chain comprising a picture type detector as described above.

According to a fourth aspect of the invention there is provided a computer program comprising code means for performing all the steps of the method described above, when the program is run on one or more computers.

According to a fifth aspect of the invention there is provided a computer-readable medium embodying a computer program product as described above.

BRIEF DESCRIPTION OF DRAWINGS

The invention will now be described, by way of example, with reference to the accompanying drawings in which.

In the Figures, like reference numerals denote like parts.

MODES FOR CARRYING OUT THE INVENTION

In general, a frame or picture comprises a top field and a bottom field. For picture alignment according to the invention, a particular coding pattern is assumed.

For example, the coding sequence shown in Table 1 is often used in H.264 encoders. This coding sequence is referred to as IBBBP encoding reflecting the coding type of the top fields of successive video frames, in which the BBBP sequence is subsequently repeated. Once a coding pattern is assumed, the video signal can be analysed for periodic changes in high frequency content. Periodic patterns in high frequency content are most likely to be due to previously applied compression algorithms rather than the video content itself. Although different coding sequences would result in different periodic patterns, only those patterns need to be analysed which are related to the coding pattern for which a downstream encoder is configured. For example, a downstream encoder set up for IBBBP coding needs to look only for IBBBP or possibly IBPBP patterns because if the upstream encoder were configured for, for example, IBBP coding, then it would not be possible to synchronise the downstream encoder to the coding structure of the upstream encoder.

TABLE 1

| IBBBP coding sequence. | | | | | | | | | | | |
|---|---|---|---|---|---|---|---|---|---|---|---|
| Frame 1 | | Frame 2 | | Frame 3 | | Frame 4 | | Frame 5 | | Frame 6 | |
| TF | BF | TF | BF | TF | BF | TF | BF | TF | BF | TF | BF |
| I | P | B | B | B | B | B | B | P | P | B | B |

Figure 1:
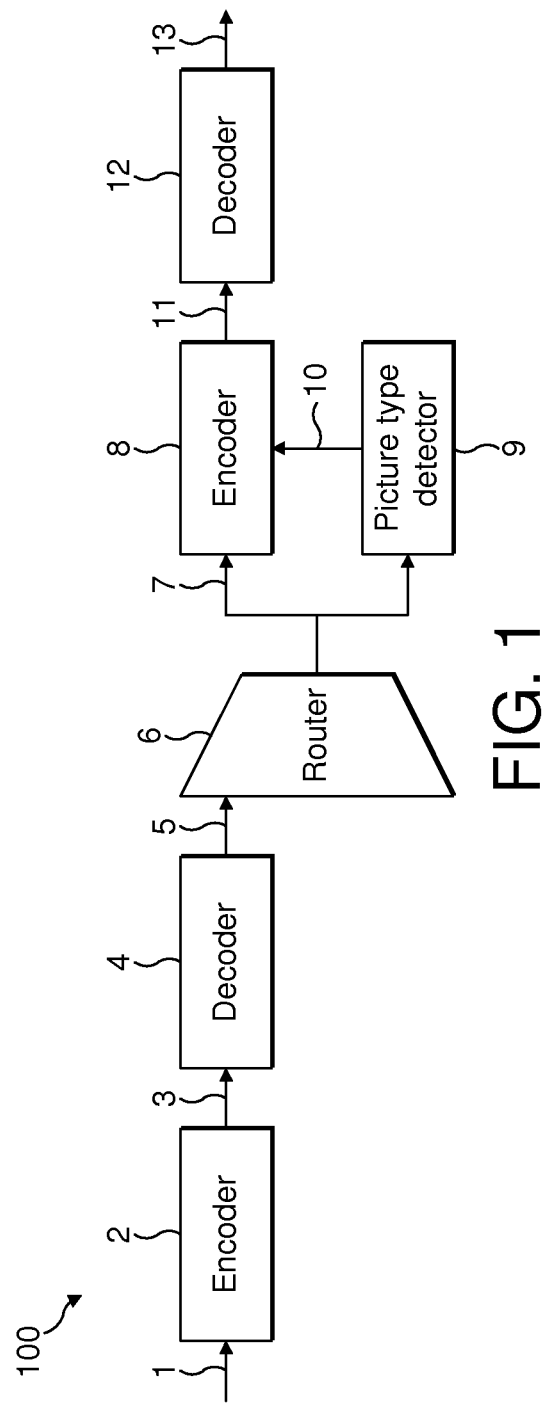
FIG. 1 is a block diagram of a compression concatenation chain according to the invention.

TF: Top Field
BF: Bottom Field
I: Intra-coding
P: Forward Predictive Coding
B: Bi-Directional Predictive Coding Referring to FIG. 1, a compression concatenation chain 100 according to the invention comprises a first encoder 2 which has an output to an input of a first decoder 4. An output of the first decoder 4 is connected to an input of a router 6, with parallel outputs to a second encoder 8 and a picture type detector 9. A control signal from the picture type detector 9 is output to a control input of the second encoder 8. An output of the second encoder 8 is output to a second decoder 12 to output an uncompressed signal 13.

In use, a video signal 1 undergoes a first compression in the first encoder 2, the compressed signal 3 is decompressed in the first decoder 4 to provide an uncompressed video signal 5. This uncompressed signal is usually fed through a router such as the router 6 to form a switched signal 7 before the signal reaches the second encoder 8. Therefore, the second encoder 8 has no direct access to the uncompressed video signal 5, only to the switched signal 7. This switched signal 7 is also input in parallel to the picture type detector 9. The picture type detector provides a control signal 10 to the second encoder 8 in order to align the picture types of the second encoder 8 to that of the first encoder 2 for an output compressed signal 11 so as to maximise the picture quality of a decoded signal 13 output from a second decoder 12.

In the following description it is assumed, by way of example, that the second encoder 8 is configured for IBBBP encoding and that the picture type detector 9 is, therefore, set up to detect a coding pattern as shown in Table 1. To reduce the complexity of the described circuit, only top fields are analysed in this example. However, it will be understood that alternatively only bottom fields or both top and bottom fields could be used. In the picture type detector 9 shown in FIG. 2, the video signal 7 is input to a high-pass filter 101, then the absolute value 104 of the filtered signal 102 is calculated by modulus module 103 as an approximation to the high-frequency energy content of the signal. The input video signal 7 is also input in parallel to a field synchronisation detector 115 to output a synchronisation signal 116. The absolute value 104 of the filtered signal 102 is input to a multi-position switch 105, which is controlled by the synchronisation signal 116 to select a next output after every field of the video signal. Once the switch 105 has reached a final position h the switch returns to a first position a on the next field. In alternate positions a, c, e and g of the switch, corresponding to top fields, absolute signal 104 is input to four accumulators 106, 107, 108 and 109 respectively. Intermediate switch positions b, d, f and h correspond to bottom fields where no calculation is carried out in the present example. The respective accumulated values 110, 111, 112 and 113 corresponding to the four top fields are output from the respective accumulators to a statistical analysis module 114. The operation of the statistical analysis is described below and is carried out every time one of the four accumulator values 110, 111, 112 or 113 changes, i.e. once per video frame, since the accumulators correspond to alternate fields in the present example.

Figure 3:
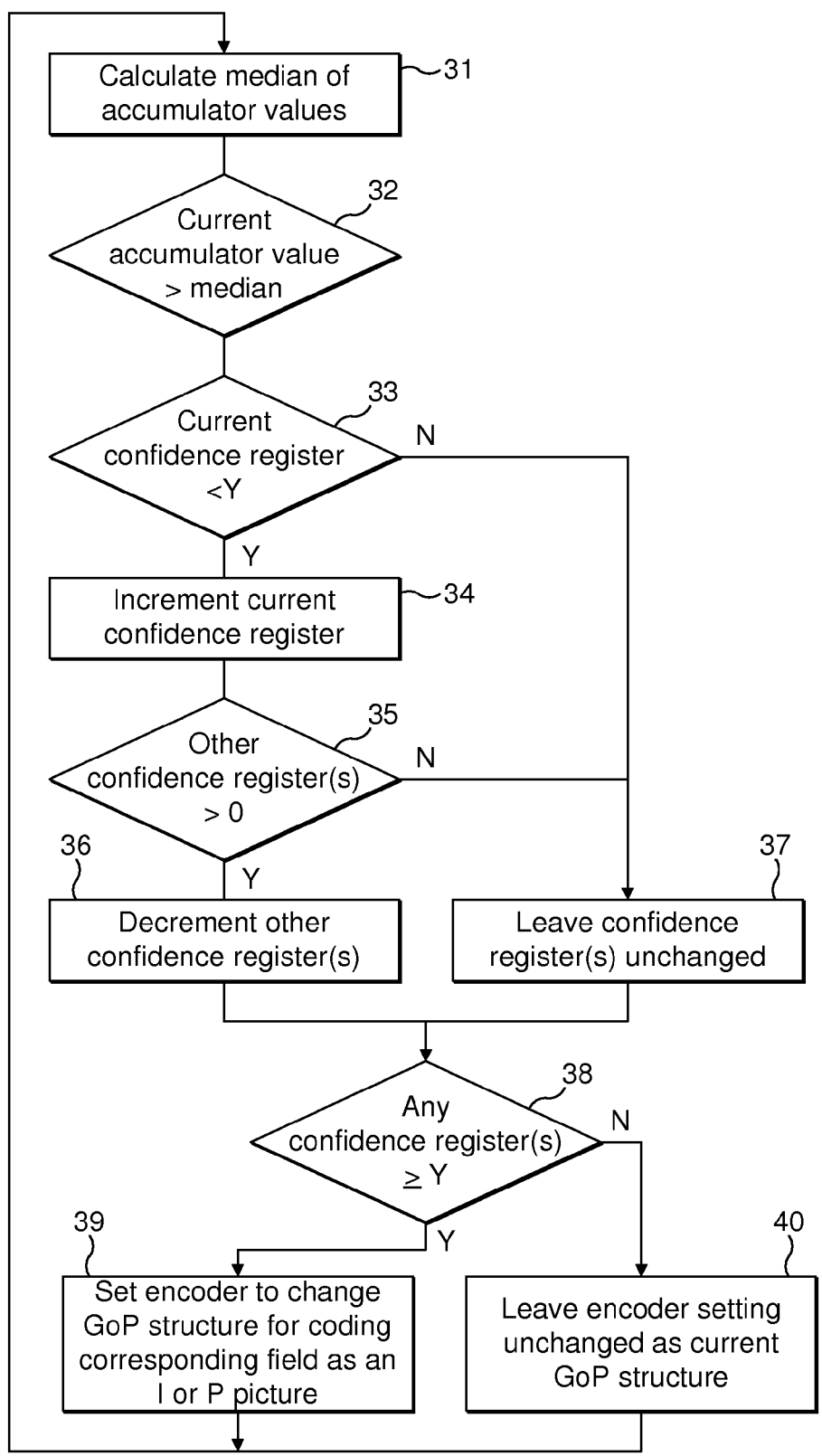
FIG. 3 is a flowchart of a method of picture type alignment according to the invention.

Statistical Analysis:

Referring to FIG. 3, for each top field position as it occurs in sequence, that is a, c, e, g at switch 105, the following steps are performed:

Calculate, step 31 a median of the four accumulator values 110, 111, 112 and 113.

Determine, step 32, whether the updated current accumulator value is greater than X * the median, where X is an appropriate constant, and increment, step 34, a confidence register in the analysis block 114 corresponding to this field position by one on determination, step 33, that its content is less than a threshold, Y, and decrement, step 36, the confidence registers of the other three field positions by one on determination, step 35, that their contents are greater than zero. If any these registers are already zero then the zero registers are left, step 37, unchanged until a next increment occurs.

Determine, step 38, whether contents of any one confidence register is greater or equal to the threshold, Y, and if so then the corresponding field position should be coded as an I or P picture. A repeating pattern of picture types may therefore be detected and the encoder set, step 39, to change the Groups of Pictures (GoP) structure to fit this finding. Otherwise the GoP structure is left, step 40, unchanged and the steps are reiterated.

A factor by which an accumulator value needs to exceed the median accumulator value to detect a change of picture type is set by experimentation. If set too high the subtle differences between I/P and B coded pictures are not detected. If set too low too many false detections occur. In practice it is found that the accumulator value should exceed the median by more than about 10 percent before the corresponding confidence register is incremented.

Large fluctuations in video content, e.g. scene cuts, will introduce some false detections. Therefore, a certain number of positive detections on a corresponding field position in the sequence are needed before the I/P picture position is known with some degree of certainty. The degree of certainty can be adjusted using the confidence register threshold value Y.

If the upstream encoder changes its coding pattern, then the confidence register which had detected the previous position of I/P pictures will rapidly decrement while the one corresponding to the new I/P position increments. The same happens when the router 6 switches to a different source.

Figure 2:
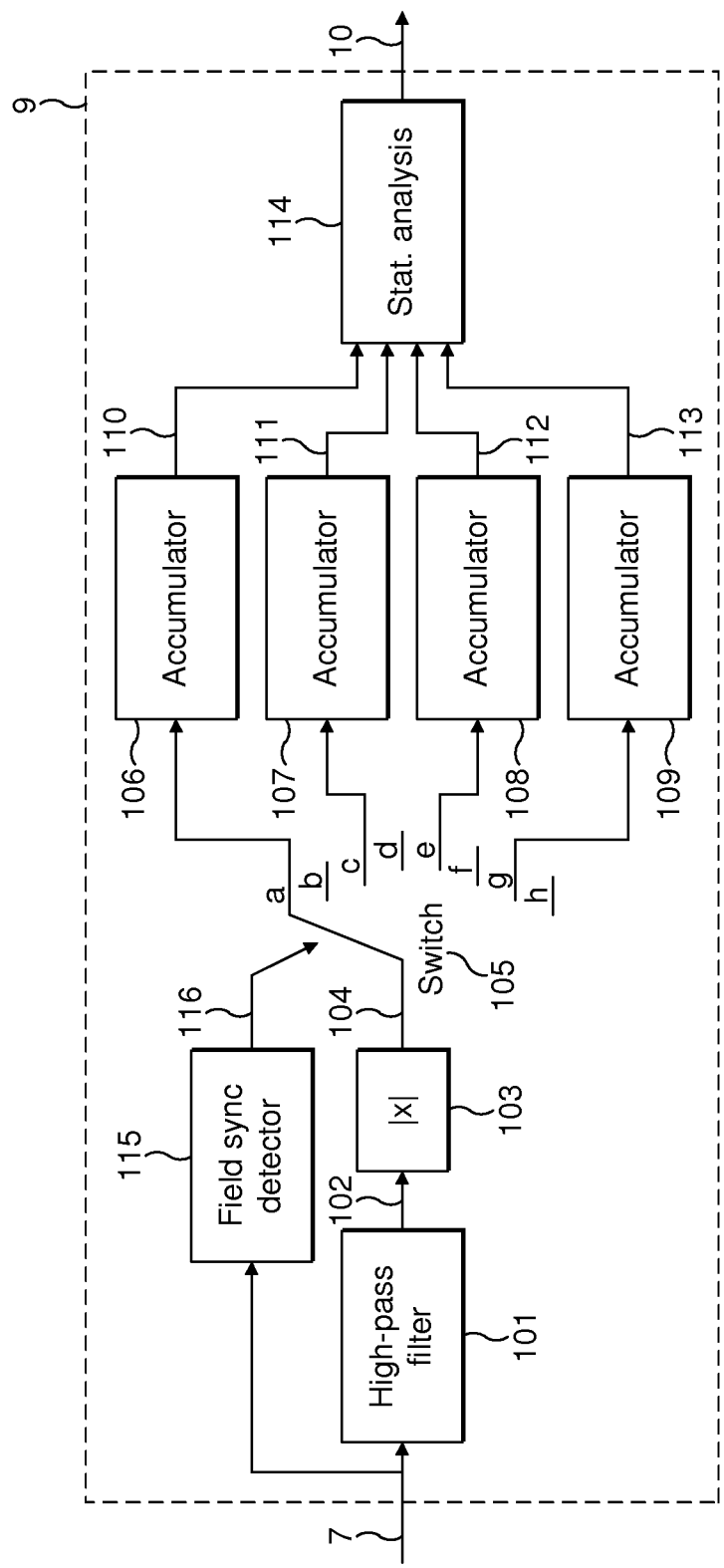
FIG. 2 is a block diagram of a picture type detector of the compression concatenation chain of FIG. 1.

The block diagram shown in FIG. 2 is only one example of an implementation of the invention. Different search patterns involving top and bottom field accumulators are used for different detection strategies.

The method of the invention is based on a principle that different picture types have different amounts of high-frequency content. In particular, B pictures are usually more heavily quantised than I or P pictures and therefore have a lower high-frequency content. This applies to MPEG-2 as well as H.264 compression. By using a high-pass filter with a cut-off frequency of about 50 percent of an occupied bandwidth, the high-frequency energy content of each picture can be measured and compared to that of neighbouring pictures. Both MPEG-2 and H.264 schemes are capable of coding each video field individually as separate pictures. Therefore, the high-frequency content is likely to vary (due to compression) from one field to the next and, consequently, the measurement of the high-frequency energy is carried out on a field-by-field basis. Of course, the high frequency content of video signals is primarily dependent on the content of the video signal itself and the effect of the chosen picture coding mode is only a secondary effect. However, by applying statistical analysis to successive pictures and analysing the video signal over a period of time, the periodic changes due to the picture coding type can be detected. The period of time used determines a number of accumulators to be used and thence a number of switched outputs required of the cyclic switch 105.

Thus, rather than trying to identify previously intra coded pictures the invention aims to distinguish I/P from B coded pictures.

The invention claimed is:

1. A picture type detector for a decompressed video signal comprising:
    a. a video signal input connected to high-pass filter means for inputting the decompressed video signal;
    b. modulus determining means connected to an output of the high-pass filter and arranged to determine a modulus of the output of the high-pass filter;
    c. field synchronisation detection means connected to the video signal input and arranged to output an end of field signal;
    d. switching means connected to receive an output of the modulus determining means and controlled by the end of field signal;
    e. a plurality of respective accumulator means connected to respective outputs of the switching means corresponding to respective fields; and
    f. statistical analysis means connected to outputs of the respective accumulator means arranged to detect a periodic change in values held by the accumulators corresponding to a periodic change of high frequency content of fields of the video signal.

2. A picture type detector as claimed in claim 1, wherein the statistical analysis means comprises:
    g. calculating means arranged to calculate a median of values held in the respective accumulator means;
    h. respective confidence registers associated with each of the respective accumulator means;
    i. incrementing means arranged to increment a confidence register associated with an accumulator means containing a value which exceeds the median by a predetermined factor when the confidence register is less than a predetermined threshold;
    j. decrementing means arranged to decrement any remaining confidence registers which are greater than zero; and
    k. setting means arranged to set an encoder for coding the corresponding field as an intra coded picture or forward predicted picture for any field for which the confidence register is equal to or exceeds the threshold value.

3. A video compression concatenation chain comprising a picture type detector as claimed in claim 1.

* * * * *